United States Patent [19]

Nassif

[11] 4,020,300
[45] Apr. 26, 1977

[54] SECTIONALIZED CRANE COLLECTOR SYSTEMS

[75] Inventor: Harry A. Nassif, Pittsburgh, Pa.
[73] Assignee: Hanco, Inc., Pittsburgh, Pa.
[22] Filed: Sept. 25, 1975
[21] Appl. No.: 616,648
[52] U.S. Cl. .............................. 191/22 R; 191/38; 200/158; 238/14.05
[51] Int. Cl.² ......................................... B60M 1/30
[58] Field of Search ............ 174/68 B, 70 B, 75 D, 174/99 B; 191/6, 8, 14, 15, 22 R, 29 R, 36, 37, 39, 44.1, 45, 46, 38; 200/158; 238/14.05, 171–172; 339/22, 24, 247

[56] References Cited

UNITED STATES PATENTS

| | | | |
|---|---|---|---|
| 2,943,793 | 7/1960 | Bonanno | 191/29 R X |
| 3,241,765 | 3/1966 | Wolfe | 200/158 X |
| 3,399,281 | 8/1968 | Corl | 191/29 R X |
| 3,689,713 | 9/1972 | Shkredka | 191/29 R |

FOREIGN PATENTS OR APPLICATIONS

| | | | |
|---|---|---|---|
| 731,424 | 7/1943 | Germany | 339/247 |

Primary Examiner—Stephen G. Kunin
Attorney, Agent, or Firm—Buell, Blenko & Ziesenheim

[57] ABSTRACT

A sectionalized crane collector system is provided for electrical power rail systems for overhead cranes and the like made up of a pair of aligned conductor rails spaced apart longitudinally to form an air gap and having upper surfaces for engagement by a current conductor movable along them, a bridging rail member of the same shape as the air gap and adapted to fit in the air gap flush with the top of the conductor rails, a conductor apparatus fixed to and parallel to the bridging rail and in electrical contact therewith, the conductor apparatus being longer than the air gap, resilient conductor apparatus on each aligned conductor rail adjacent the air gap releasably engaging the ends of the parallel conductor member, vertically movable carrier apparatus adjacent said air gap carrying the parallel conductor means between a first position engaging the resilient conductor apparatus in which the bridging rail member fills the air gap flush with the top of the aligned rails and a second position in which the parallel conductor apparatus is out of engagement with the resilient conductor apparatus and the bridging rail member is removed from the air gap, and drive apparatus acting on said carrier apparatus to move it selectively between said first and second position.

5 Claims, 4 Drawing Figures

SECTIONALIZED CRANE COLLECTOR SYSTEMS

This invention relates to sectionalized crane collector systems and particularly to sectionalized electric overhead traveling crane collector systems in which power is supplied by the use of collector shoe assemblies on the cranes and a collector rail on which the shoe rides.

Electric overhead traveling cranes are used in many industrial and commercial installations for handling all sorts of material. Generally, such cranes run on rails extending lengthwise of the building on opposite sides of the building and are supplied with electric power from a shoe or other pick up means running on a conductor such as a rail. In many cases several cranes are operative on the same trackway. In every case, however, it is frequently desirable to be able to isolate electrically a crane or a section of runway from the balance of the system so that parts of the collector rail, the crane collector shoe assembly, etc., can have maintenance work performed thereon without danger of electrical shock.

There have in the past been apparatus proposed for accomplishing this. For example, U.S. Pat. No. 1,309,717 provides a section insulator in the form of a conductor segment carried on a sliding frame having a rack operated by a hand driven pinion to move the conductor segment into and out of position in the system. U.S. Pat. No. 1,051,091 shows a rotary device for rotating a portion of the conductors in and out of the conductive system. U.S. Pat. No. 3,241,765 shows manually removable air gap members for sectionalizing a conductor. While all of these devices of the prior art are workable they are slow and yet relatively complex in structure.

I have developed a sectionalized crane conductor system which is relatively simple, easily operated and free of manual effort. It is safe, positive and fast operating.

I preferably provide in an electrical power rail system, a pair of aligned conductor rails spaced apart longitudinally to form an air gap and having upper surfaces for engagement by a current collector movable along them, a conductor bridging rail member adapted to fit in said air gap flush with the top of said rails and mounted on a parallel conductor means longer than said gap, resilient conductor means on each aligned conductor rail adjacent the air gap releasably engaging the ends of said parallel conductor member, vertically movable carrier means adjacent said air gap carrying said parallel conductor means from a first position engaging said resilient conductor means in which the bridging rail member fills said air gap flush with the top of the aligned rails to a second position in which the parallel conductor member is out of engagement with said resilient conductor means and the bridging rail member is removed from the air gap, and means acting on said carrier means to move it selectively between said first and second positions. Preferably the air gap has the form of an isosceles trapezoid and the bridging rail member has the same shape. Preferably the parallel conductor means is a pair of spaced blade bus bars of copper or brass parallel to the bridging rail and having a top knife edge entering between spaced pairs of switch pole members. The means acting on the carrier means is preferably a screw and threaded tube arrangement.

In the foregoing general description of my invention I have set out certain objects, purposes and advantages of my invention. Other objects, purposes and advantages of my invention will be apparent from the following description and the accompanying drawings in which.

Figure 1:
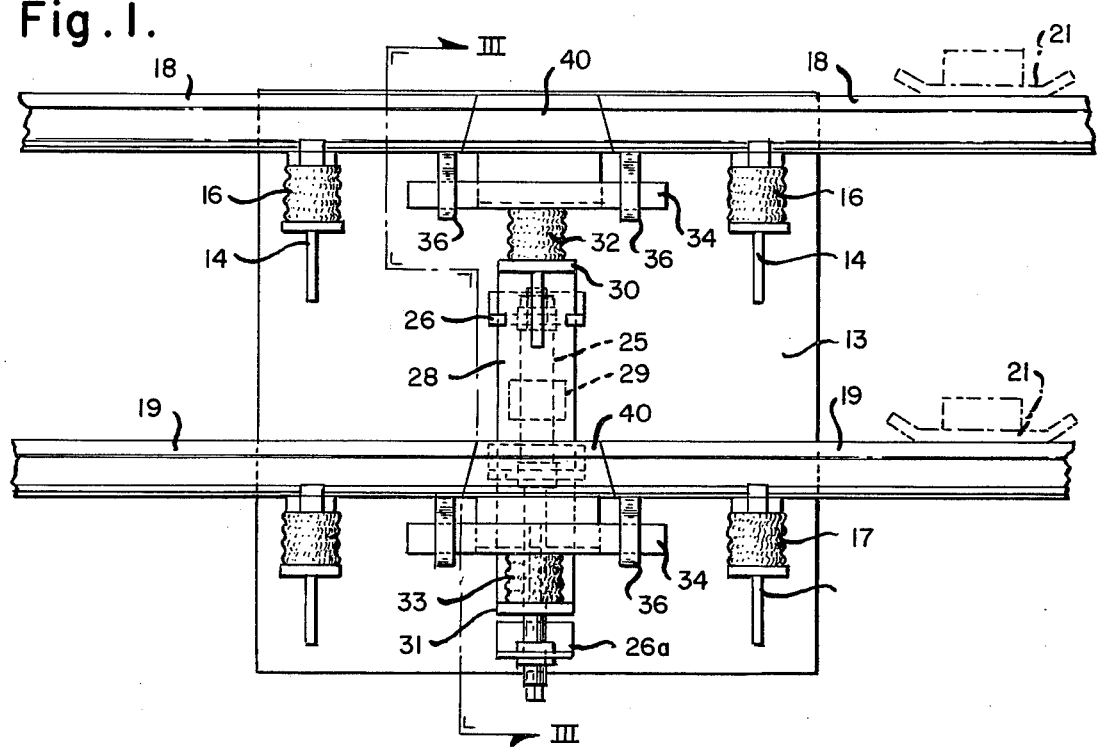
FIG. 1 is a generally diagrammatic view of a running rail and pair of power rails in accordance with this invention in power conducting position.
Figure 2:
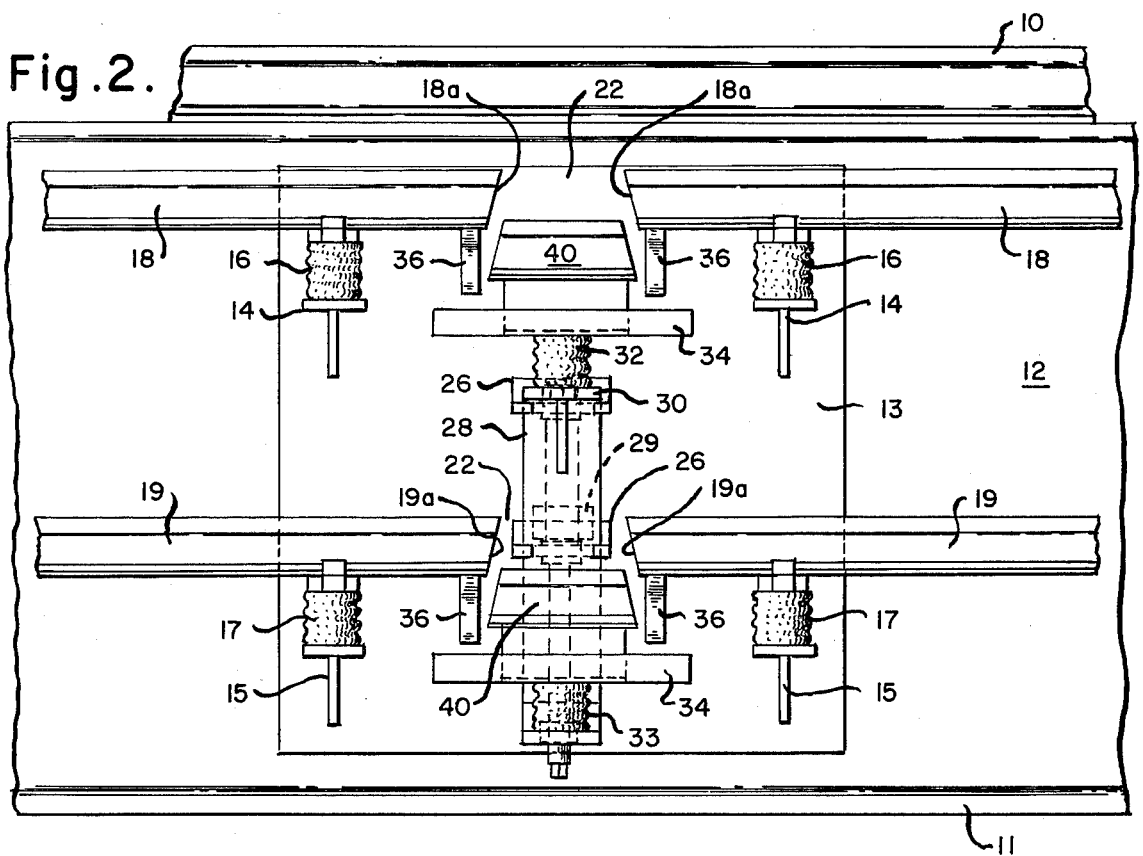
FIG. 2 is the same view as FIG. 1 with the power rails in non-conducting position.
Figure 3:
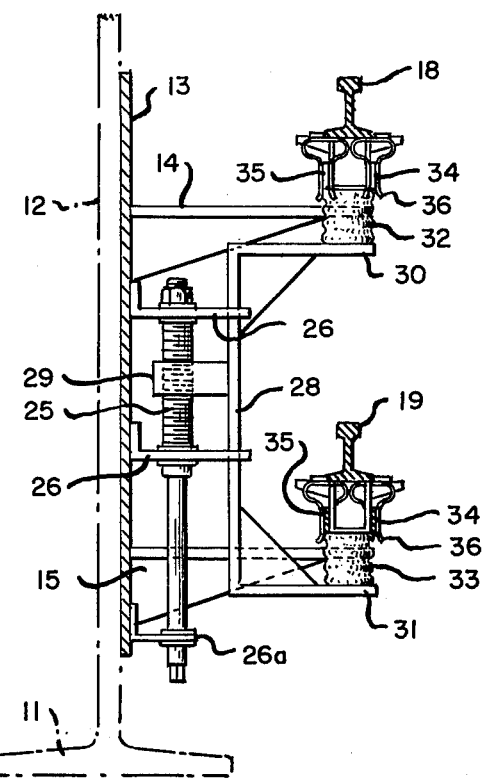
FIG. 3 is an end view of the assembly of FIG. 1.
Figure 4:
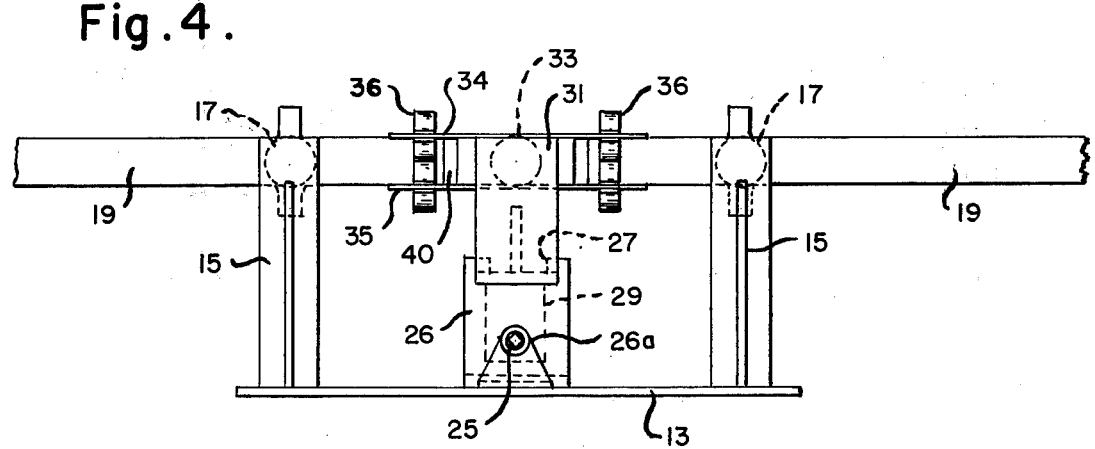
FIG. 4 is a bottom plan view of the assembly of FIG. 1.

Referring to the drawings, I have illustrated an overhead crane arrangement of the sort used in steel mills into which my invention has been incorporated. A running rail 10 is mounted in the usual fashion on beam 11 of the building in which the crane operates. On the web 12 of beam 11 is attached a plate 13 with two horizontally extending members 14 and 15 generally parallel to each other and spaced apart vertically. At the outer ends of members 14 and 15 are insulators 16 and 17 on top of which are mounted conductor or power rails 18 and 19 through which electrical power is supplied to a crane by pick-up shoes 21. All the foregoing equipment is conventional and well known.

At a selected point where it is desired to sectionalize the power rails, the two rails 18 and 19 are spaced apart to form a gap 22, with the ends 18a and 19a beveled or sloped from the rail head or top in isosceles trapezoidal form as shown. A rotatable screw 25 is mounted in brackets 26 and 26a on plate 13 below air gap 22. Brackets 26 have a guideway 27 on their outer ends in which C-shaped carrier member 28 moves vertically by reason of nut 29 fixed thereon and threaded on screw 25. The two legs 30 and 31 of the C member carry insulation 32 and 33 on which are mounted spaced knife bus bars 34 and 35 which are longer than the bottom of the air gap and whose ends are adapted to engage in spring loaded switch pole members 36 on each of the ends of power rails 18 and 19 on opposite sides of the air gap. A bridge rail 40 of isosceles trapezoidal shape identical to that of the air gap is mounted on the bus bars 34 and 35 and in electrical contact therewith.

In operation when it is desired to isolate a section of the power rails 18 and 19, the screw 25 is turned to move nut 29 downwardly. The rotation of screw 25 could be done manually or by a motor drive, not shown. This movement of nut 29 downwardly carries with it C member 28 causing the bus bars 34 and 35 to leave the pole members 36 and lowering the bridging rail 40. This opens the air gap separating the sections of rail and interrupts the flow of electricity between the two sections of rail. When it is desired to reconnect the rails, the reverse operation is carried out.

The screw 25 and nut 29 could be replaced by a double acting hydraulic cylinder and piston or by any other conventional form of device capable of imparting longitudinal motion in two directions.

While I have illustrated and described certain presently preferred embodiments of this invention, it will be clear that this invention may be otherwise embodied within the scope of the following claims.

I claim:

1. In an electrical power rail system, a pair of aligned conductor rails spaced apart longitudinally to form an air gap and having upper surfaces for engagement by a current conductor movable along them a single bridging rail member of the same shape as said air gap and adapted to fit in said air gap flush with the top of said conductor rails, a parallel conductor means fixed to and parallel to said bridging rail and in electrical contact therewith to form an integral unit, said conductor means being longer than the air gap and extending beyond said bridging rail member, resilient conductor means on each aligned conductor rail adjacent the air gap releasably engaging the ends of said parallel conductor means, vertically movable carrier means adjacent said air gap simultaneously carrying said bridging rail member and said parallel conductor means vertically between a first position engaging said resilient conductor means in which the bridging rail member fills the air gap flush with the top of said aligned rails and a second position in which the parallel conductor means is out of engagement with said resilient conductor means and the bridging rail member is removed from the air gap, and drive means acting on said carrier means to move it selectively between said first and second position.

2. A power rail system as claimed in claim 1 wherein the air gap and bridging rail member are in the form of substantially identical isosceles trapezoids.

3. In an electrical power rail system, a pair of aligned conductor rails spaced apart longitudinally to form an air gap and having upper surfaces for engagement by a current conductor movable along them, a bridging rail member of the same shape as said air gap and adapted to fit in said air gap flush with the top of said conductor rails, a conductor means fixed to and parallel to said bridging rail and in electrical contact therewith, said conductor means being longer than the air gap, resilient conductor means on each aligned conductor rail adjacent the air gap releasably engaging the ends of said parallel conductor member, vertically movable carrier means adjacent said air gap carrying said parallel conductor means between a first position engaging said resilient conductor means in which the bridging rail member fills the air gap flush with the top of said aligned rails and a second position in which the parallel conductor means is out of engagement with said resilient conductor means and the bridging rail member is removed from the air gap, and drive means acting on said carrier means to move it selectively between said first and second position said parallel conductor means being a pair of spaced blade bus bars having a top knife edge and said resilient conductor means being switch pole members.

4. A power rail system is claimed in claim 1 wherein the drive means is a rotating screw and nut movable thereon, said nut being fixed to the carrier means.

5. In an electrical power rail system, two sets of parallel spaced apart aligned rails each rail including a pair of aligned conductor rails spaced apart longitudinally to form an air gap and having upper surfaces for engagement by a current conductor movable along them, a bridging rail member of the same shape as said air gap and adapted to fit in said air gap flush with the top of said conductor rails, a conductor means fixed to and parallel to said bridging rail and in electrical contact therewith, said conductor means being longer than the air gap, resilient conductor means on each aligned conductor rail adjacent the air gap releasably engaging the ends of said parallel conductor member, vertically movable carrier means adjacent said air gap carrying said parallel conductor means between a first position engaging said resilient conductor means in which the bridging rail member fills the air gap flush with the top of said aligned rails and a second position in which the parallel conductor means is out of engagement with said resilient conductor means and the bridging rail member is removed from the air gap, said air gaps being in vertical alignment with one other, a C shaped carrier member each leg of which carries one of said conductor members and bridge rail and drive means moving said C shaped carrier member simultaneously between said first and second positions for both aligned conductor rails.

* * * * *